(12) United States Patent
Schumacher et al.

(10) Patent No.: US 7,000,400 B2
(45) Date of Patent: Feb. 21, 2006

(54) TEMPERATURE VARIANCE REDUCTION USING VARIABLE PENETRATION DILUTION JETS

(75) Inventors: Jurgen C. Schumacher, Phoenix, AZ (US); Ian L. Critchley, Phoenix, AZ (US); David G. Walhood, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 21 days.

(21) Appl. No.: 10/803,428

(22) Filed: Mar. 17, 2004

(65) Prior Publication Data
US 2005/0204744 A1 Sep. 22, 2005

(51) Int. Cl.
*F23R 3/58* (2006.01)

(52) U.S. Cl. .................. 60/772; 60/39.37; 60/752
(58) Field of Classification Search .............. 60/772, 60/722, 752, 39.37, 755, 757; 415/212.1
See application file for complete search history.

(56) References Cited

U.S. PATENT DOCUMENTS

| | | | |
|---|---|---|---|
| 5,220,795 A | 6/1993 | Dodds et al. | |
| 5,289,686 A | 3/1994 | Razdan et al. | |
| 6,101,814 A | 8/2000 | Hoke et al. | |
| 6,260,359 B1 | 7/2001 | Monty et al. | |
| 6,543,233 B1 | 4/2003 | Young et al. | |
| 6,606,861 B1 | 8/2003 | Snyder | |
| 6,742,989 B1 * | 6/2004 | Osako et al. | 415/205 |
| 6,912,782 B1 * | 7/2005 | Nguyen et al. | 29/888.01 |
| 2002/0116929 A1 | 8/2002 | Snyder | |
| 2003/0200752 A1 | 10/2003 | Moertle et al. | |

* cited by examiner

*Primary Examiner*—Ehud Gartenberg
(74) *Attorney, Agent, or Firm*—Ingrassia Fisher & Lorenz

(57) ABSTRACT

A variable penetration dilution jet array for a single can and scroll assembly includes a plurality of differentially sized dilution openings around the circumference of the combustor can. The alternating smaller and larger openings provide for circumferential and radial mixing uniformity with the smaller openings giving shallow penetration and the larger openings enabling deep core penetration. The larger openings provide dilution air to the hot gas flow core without the need for an increase in combustor pressure drop. The smaller openings provide a film cooling flow to the downstream scroll, reducing dedicated scroll cooling requirements.

33 Claims, 4 Drawing Sheets

TEMPERATURE VARIANCE REDUCTION USING VARIABLE PENETRATION DILUTION JETS

GOVERNMENT RIGHTS

The invention was made with Government support under contract number N00019-02-C-3002, awarded by the U.S. Navy. The Government has certain rights in this invention.

BACKGROUND OF THE INVENTION

The present invention generally relates to gas turbine engine systems and, more particularly, to combustor assemblies for gas turbine engines.

Combustor assemblies are integral components of gas turbine engines. The combustor assembly may be positioned in flow communication with a compressor, a fuel injector and one or more turbines. During engine operation, pressurized air from the compressor and fuel from the fuel injector may enter the combustor. The resulting fuel/air mixture may be ignited to produce a high temperature combustion gas stream. The hot combustion gas then flows downstream to the turbines for energy extraction.

The extreme temperature environment resulting from the hot combustion gas stream limits the useful operating time and ultimately component life of the combustor and turbines. The turbine and combustor components are very sensitive to variations and extremes in temperature. Methods for mitigating the negative effects of the high temperature combustion gas have been disclosed.

A multihole patch for a combustor liner has been disclosed in U.S. Pat. Application No. 2003/0200752. In the described method, patches of dissimilar sized holes are used for cooling the liner wall. Cooling of the walls is provided by a combination of orifices behind nuggets and groups of small holes drilled at an angle in regions requiring augmented cooling. Although the described method may reduce the thermal stress to the combustor liner, a reduction in the thermal stress experienced by the downstream components is still needed. Further, a reduction in gas stream temperature variation is also needed.

Another combustor liner has been disclosed in U.S. Pat. No. 6,260,359. The described liner is provided with two rows of close-coupled dilution holes at different axial positions. The first row of holes (primary) is of uniform size and has an equiangular spacing. The second set of dilution holes is of varying size to minimize hot-streaks formed by the fuel injectors and to provide a uniform circumferential pattern factor (temperature variation). Although the described combustor liner may reduce temperature variation across the plane of the combustor outlet, the disclosed combustor is an annular combustor and does not address the need for reductions in scroll wall temperatures, as annular combustor configurations do not include scrolls.

A combustor for a turbine engine is described in U.S. Pat. No. 6,606,861. The disclosed combustor is provided with major and minor dilution jets to regulate the spatial temperature profile of the exhaust gases from the combustor. Although the disclosed combustor may reduce temperature variation, the described combustor is also an annular combustor and, therefore, does not address the need for scroll wall temperature reductions. An annular combustor or can-annular (separate cans in a common annulus) arrangement may not be suitable for some turbine engine applications.

A single can and scroll type configuration may be desirable for some applications. The single can and scroll configuration has a single fuel injector. The need for only one fuel injector may simplify engine design, maintenance, and repair, thus reducing the associated cost. The single can and scroll configuration allows for the use of a fuel injector that is larger than the fuel injectors suitable for use in annular combustors. This is advantageous in ameliorating fuel injector coking. Fuel injector coking is a function of the dimensions of the fuel injector's internal passages. Larger fuel injectors have larger internal passages and therefore are more resistant to coking. Yet another advantage of the single can and scroll configuration is that the thermal stress on downstream components is reduced due to the better pattern factor through the scroll.

Although there are several advantages of the single can and scroll arrangement, one disadvantage is that the scroll has a relatively large surface area. Depending on the engine operating cycle, the scroll may require air cooling and sufficient air may not be available to allow effusion or film cooling over such a large surface. Additionally, for some applications, the conventional dilution cooling arrays have met with limited success. Conventional dilution cooling arrays comprise equi-sized dilution orifices and may provide inadequate penetration of cooler air to the core of the hot combustion gases in some applications. Although penetration of the dilution air may be increased by increasing the combustor pressure drop, this is not a desirable option since the pressure drop represents a parasitic loss on the engine performance.

As can be seen, there is a need for improved combustor assemblies. Additionally, improved can/scroll combustors are needed wherein the scroll cooling requirements are reduced. Further, dilution cooling arrays having improved core penetration without an increase in combustor pressure drop are needed. Combustor improvements allowing for easy retrofit to existing designs also are needed. Improved combustors are needed wherein temperature variation across the combustor exit plane is reduced.

SUMMARY OF THE INVENTION

In one aspect of the present invention, a combustor assembly comprises a combustor can, the combustor can suitable for use with a scroll; and a variable penetration dilution jet array, utilizing orifice arrays of non-equal diameter, positioned in an aft portion of the combustor can there through, the variable penetration dilution jet array capable of simultaneously reducing combustor exit temperature variance and providing a film cooling flow to the scroll.

In another aspect of the present invention, a can and scroll combustor assembly comprises a combustor can; a scroll positioned downstream and in flow communication with the combustor can; a plurality of scroll cooling openings through the combustor can, the scroll cooling openings capable of providing dilution air and a film cooling flow to the scroll; and a plurality of core penetrating openings through the combustor can, the core penetrating openings capable of providing dilution air to a hot gas flow core of the combustor can.

In still another aspect of the present invention, a variable penetration dilution jet array for an assembly having a can and a scroll comprises a plurality of core penetrating openings positioned circumferentially about the can; a plurality of scroll cooling openings positioned circumferentially about the can, the scroll cooling openings are offset from the core penetrating openings; and a plurality of intermediate openings positioned circumferentially about the can, the intermediate openings are offset from the core penetrating openings.

In yet another aspect of the present invention, a combustor assembly for a turbine engine having a scroll comprises a combustor can; a plurality of core penetrating openings circumferentially positioned about an axial plane of the combustor can, the core penetrating openings uniformly spaced; and a plurality of scroll cooling openings circumferentially positioned about the axial plane of the combustor, the scroll cooling openings uniformly spaced.

In a further aspect of the present invention, an apparatus for a can and scroll combustor assembly comprises at least one core penetrating opening through an aft end portion of the can, the core penetrating opening capable of providing dilution air to a hot gas flow core of the can; at least one scroll cooling opening through the aft end portion of the can, the scroll cooling opening capable of providing a film cooling flow to the scroll; and at least one intermediate opening through the aft end portion of the can, the intermediate opening capable of reducing temperature variation at the exit plane of the can.

In still another aspect of the present invention, a method of providing dilution air to a can and scroll assembly comprises the steps of projecting a first portion of dilution air through at least one axial plane of the can such that a film cooling flow is provided to the scroll; and projecting a second portion of dilution air through at least one axial plane of the can such that the temperature of a hot gas flow core of the can is reduced.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides gas turbine combustor assemblies and methods for producing the same. The combustor assemblies produced according to the present invention may find beneficial use in many industries including aerospace and industrial applications. The combustor assemblies of the present invention may be beneficial in applications including aircraft propulsion, naval propulsion, electricity generation, pumping sets for gas and oil transmission, automobile engines, and stationary power plants. This invention may be useful in any gas turbine engine application.

Figure 1:
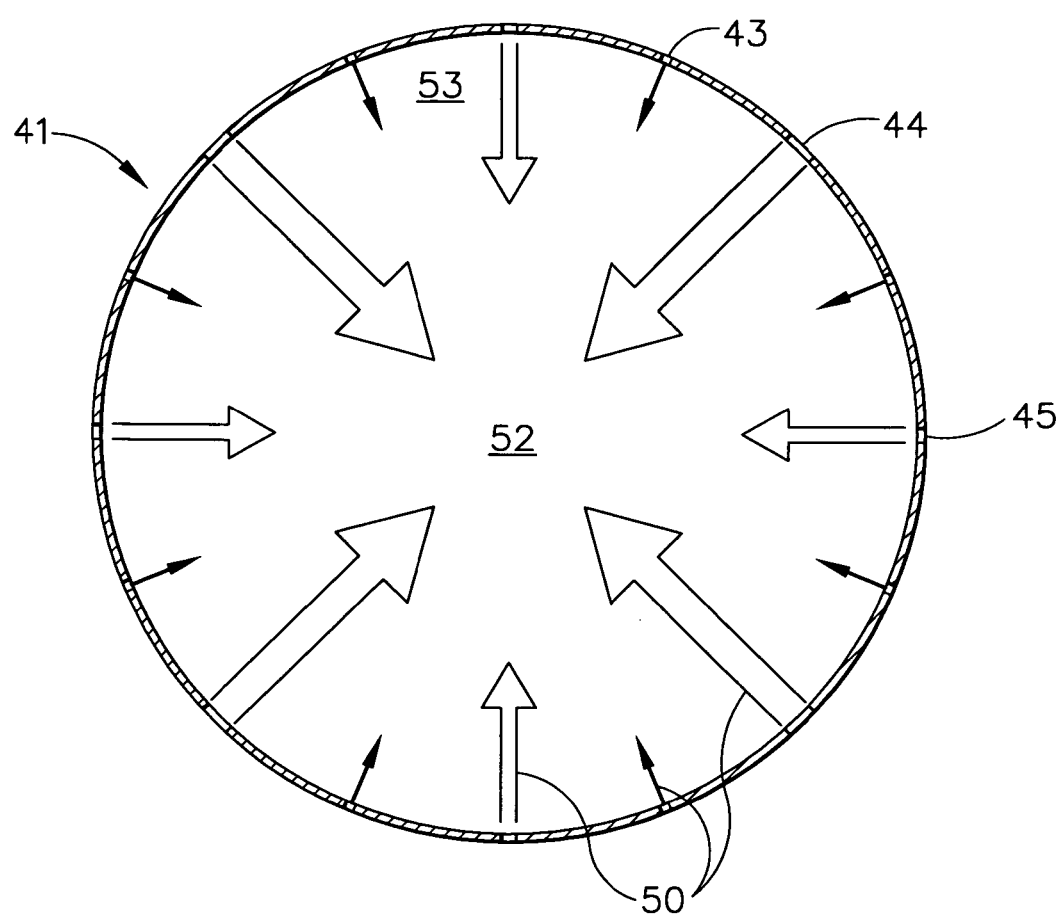
FIG. 1 is a cross-sectional schematic view of a combustor assembly according to one embodiment of the present invention.

The current invention provides for a variable penetration of dilution air into the hot core by employing differential dilution orifice sizing around the circumference of the combustor can. Unlike the prior art, the present invention provides dilution air at several radial locations simultaneously, as shown in FIG. 1. Alternating smaller (scroll cooling openings 43) and larger holes (core penetrating openings 44) may provide for improved mixing uniformity with the smaller jets (scroll cooling openings 43) giving shallow penetration and the larger jets (core penetrating openings 44) enabling deep core penetration. With the present invention, a more uniform plane of cool dilution air 50 may be introduced near the exit of the combustor can 41 to limit the variance in the temperature distribution experienced by the turbine components. In effect, the dilution air 50 may be projected at several radial locations simultaneously. In this way, a large dilution jet penetration may be achieved without resorting to the high combustor pressure loss of prior art methods. The largest jets (core penetrating openings 44), having the largest penetration may reach the hot gas flow core 52 and reduce the maximum temperature of the gases leaving the combustor can 41. The smallest jets (scroll cooling openings 43) may not penetrate the hot gas flow excessively and air from these jets may remain in the near wall region 53 simultaneously providing near-wall dilution of the combustor gas stream and forming a layer of cooler gases that may protect the downstream scroll walls.

Figure 2A:
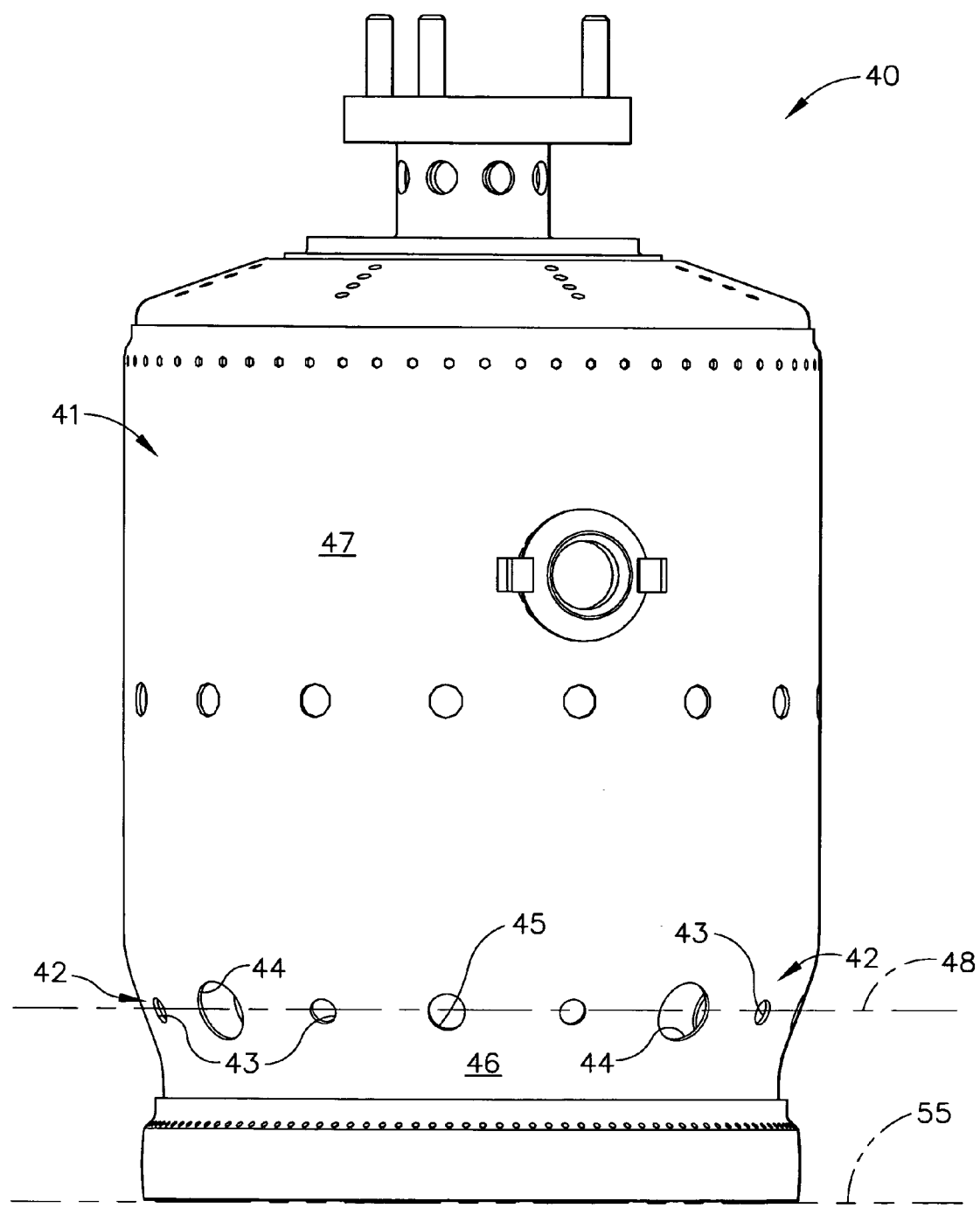
FIG. 2a is a plan view of a combustor assembly according to one embodiment of the present invention.

In one embodiment, shown in FIG. 2a, the present invention provides a combustor can assembly 40 for a gas turbine engine (not shown). The combustor can assembly 40 may comprise a combustor can 41 having a variable penetration dilution jet array 42 there through. The variable penetration dilution jet array 42 may be positioned in the aft portion 46 of the combustor can 41. Unlike the prior art, the variable penetration dilution jet array 42 may comprise a plurality of scroll cooling openings 43, a plurality of core penetrating openings 44 and a plurality of intermediate openings 45.

Figure 3:
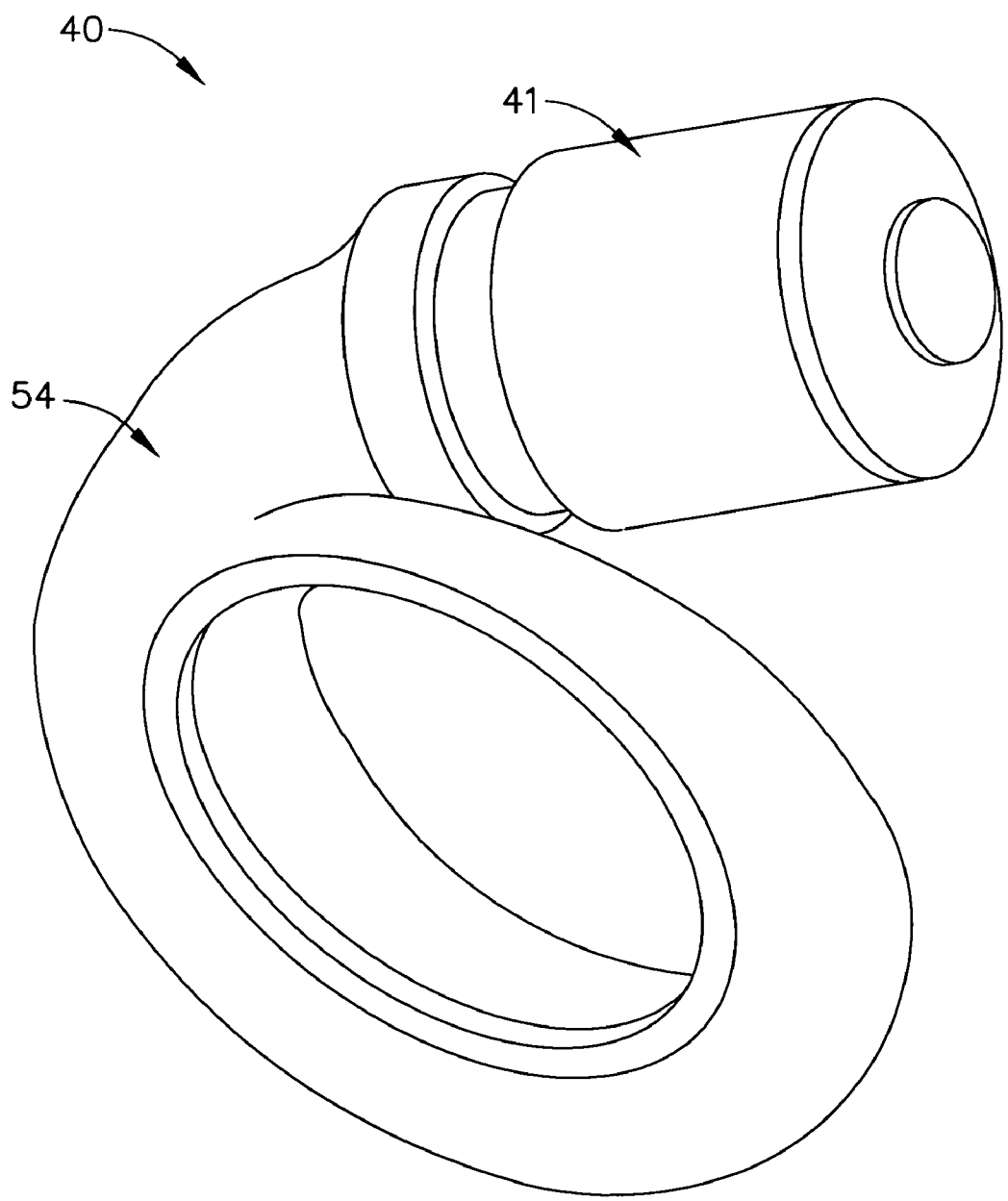
FIG. 3 is a perspective view of a combustor can and scroll assembly according to one embodiment of the present invention.

During engine operation, dilution air 50 from the scroll cooling openings 43 may provide a film cooling flow to a downstream scroll 54 (shown in FIG. 3), which also is unlike the prior art. The scroll cooling openings 43 may reduce or eliminate the need for dedicated scroll wall cooling, be it effusion or film cooling. The film cooling flow provided by the present invention may reduce scroll cooling requirements to the point where the use of a single can and scroll arrangement may be feasible even in relatively hot engine cycles. Dilution air 50 from the core penetrating openings 44 may provide cooling air to the hot gas flow core 52, which also is unlike the prior art. The intermediate openings 45, in combination with the core penetrating openings 44 and the scroll cooling openings 43, may provide an improved pattern factor at the exit plane 55 of the combustor can 41.

A useful combustor can 41 of the present invention may comprise any combustor can 41 suitable for use with a downstream scroll 54. The diameter of the combustor can 41 may be uniform along the length of the combustor can 41, such as a cylindrical combustor can (not shown). The diameter of the combustor can 41 may vary along the length of the combustor can 41, such as a tapered aft end combustor can 47 shown in FIG. 2a.

Figure 2B:
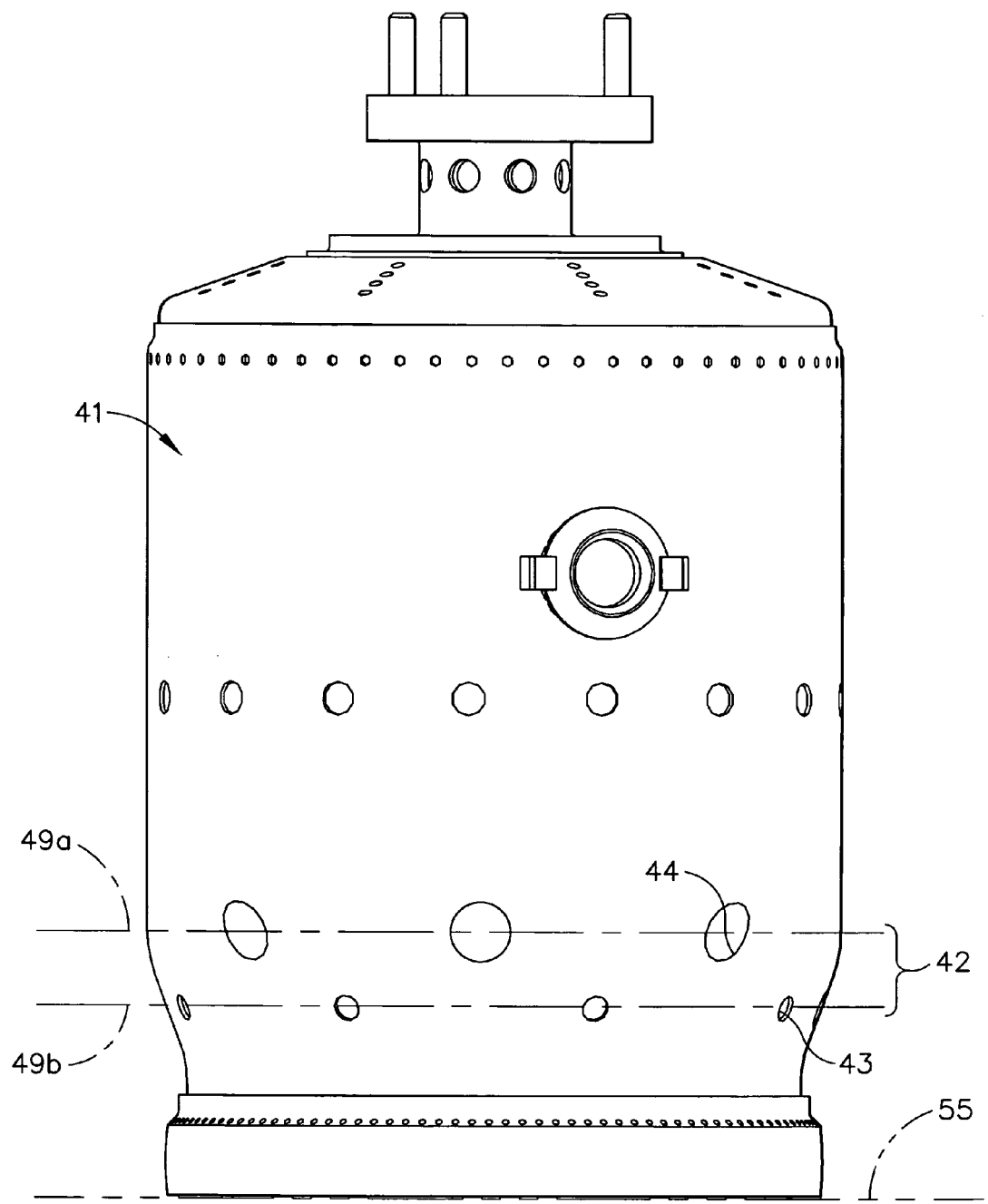
FIG. 2b is a plan view of a combustor assembly according to another embodiment of the present invention.

The variable penetration dilution jet array 42 may be positioned within the aft portion 46 of the combustor can 41. The aft portion 46 may be the downstream end of the combustor can 41 and may have an axial length of less than about one third the axial length of the combustor can 41. The variable penetration dilution jet array 42 may be positioned in one or more axial planes 48. For example, the variable penetration dilution jet array 42 may comprise a plurality of core penetrating openings 44 positioned in a first axial plane 49a and a plurality of scroll cooling openings 43 positioned in a second axial plane 49b, as shown in FIG. 2b. Alternatively, the variable penetration dilution jet array 42 may comprise a plurality of core penetrating openings 44, a plurality of intermediate openings 45 and a plurality of scroll cooling openings 43 all of which are positioned in the same axial plane 48, as in FIG. 2a. Another embodiment of the present invention may include core penetrating openings 44 and intermediate openings 45 in a first axial plane 49a, intermediate openings 45 and scroll cooling openings 43 in a second axial plane 49b, and scroll cooling openings 43 in a third axial plane (not shown). The variable penetration dilution jet array 42 of the present invention may be positioned within one or more axial planes 48; each axial plane 48 may comprise one or more dilution jet opening forms. As used herein, a dilution jet opening form is an opening selected from the group consisting of scroll cooling opening 43, core penetrating opening 44 and intermediate opening 45. A useful variable penetration dilution jet array 42 may comprise at least two dilution jet opening forms. The useful number of axial planes 48 and useful positions of dilution jet opening forms may vary with engine design and combustor dimensions. Computational fluid dynamics (CFD) analysis may be useful in determining the desired number of axial planes 48 and the desired positions of dilution jet opening forms for a particular engine design.

The scroll cooling openings 43 of the variable penetration dilution jet array 42 may be capable of providing film cooling to a downstream scroll 54. Dilution air 50 may pass through the scroll cooling openings 43 and remain in the near wall region 53 as it flows axially downstream to provide a film cooling flow to a combustor scroll 54, thereby reducing scroll cooling requirements. The near wall region 53 may be the area within the combustor can 41 that is radially outward from the hot gas flow core 52. The scroll cooling openings 43 may be positioned such that they are equally circumferentially spaced in at least one axial plane 48 of the combustor can 41. For a variable penetration dilution jet array 42 having scroll cooling openings 43 in more than one axial plane 48, the scroll cooling openings 43 in one axial plane 48 may be offset from the scroll cooling openings 43 in another axial plane 48. The number of scroll cooling openings 43, the diameter of the scroll cooling openings 43, and the location of the scroll cooling openings 43 may vary with engine design and combustor dimensions. CFD analysis may be useful in determining the desired number, diameter and location of the scroll cooling openings 43. The diameter of useful scroll cooling openings 43 may depend on factors including combustor can 41 diameter. The number of useful scroll cooling openings 43 may depend on factors including combustor can 41 circumference. For example, for a combustor can 41 having a diameter of 5¼ inches and a circumference of 16½ inches, the useful number of scroll cooling openings 43 may be 8 and the diameter of a useful scroll cooling opening 43 may be about 0.200 inches. Although the diameter of a scroll cooling opening 43 may vary with engine design, the diameter of a useful scroll cooling opening 43 may be between about 0.100 inches and about 0.300 inches.

The core penetrating openings 44 of the variable penetration dilution jet array 42 may be capable of providing dilution air 50 to the hot gas flow core 52. Dilution air 50 passing through the core penetrating openings 44 may reduce the temperature of the hot gas flow core 52. The core penetrating openings 44 may be positioned such that they are equally circumferentially spaced in at least one axial plane 48 of the combustor can 41. For a variable penetration dilution jet array 42 having core penetrating opening 44 in more than one axial plane 48, the core penetrating openings 44 in one axial plane 48 may be offset from the core penetrating openings 44 in another axial plane 48. The number of core penetrating openings 44, the diameter of the core penetrating openings 44, and the location of the core penetrating openings 44 may vary with engine design and combustor dimensions. CFD analysis may be useful in determining the desired number, diameter and location of the core penetrating openings 44. The diameter of useful core penetrating openings 44 may depend on factors including combustor can 41 diameter. The number of useful core penetrating openings 44 may depend on factors including combustor can 41 circumference. For example, for a combustor can 41 having a diameter of 5¼ inches and a circumference of 16½ inches, the useful number of core penetrating openings 44 may be 4 and the diameter of a useful core penetrating opening 44 may be about ½ inch. Although the diameter of a core penetrating opening 44 may vary with engine design, the diameter of a useful core penetrating opening 44 may be between about 0.400 inches and about 0.800 inches.

The intermediate openings 45 of the variable penetration dilution jet array 42 may be capable of improving circumferential and radial mixing uniformity and thereby further reducing the variance in the temperature distribution experienced by the downstream turbine components. The intermediate openings 45 may be positioned such that they are equally circumferentially spaced in at least one axial plane 48 of the combustor can 41. For a variable penetration dilution jet array 42 having intermediate openings 45 in more than one axial plane 48, the intermediate openings 45 in one axial plane 48 may be offset from the intermediate openings 45 in another axial plane 48. The number of intermediate openings 45, the diameter of the intermediate openings 45, and the location of the intermediate openings 45 may vary with engine design and combustor dimensions. CFD analysis may be useful in determining the desired number, diameter and location of the intermediate openings 45. The diameter of useful intermediate openings 45 may depend on factors including combustor can 41 diameter. The number of useful intermediate openings 45 may depend on factors including combustor can 41 circumference. For example, for a combustor can 41 having a diameter of 5¼ inches and a circumference of 16½ inches, the useful number of intermediate openings 45 may be 4 and the diameter of a useful intermediate opening 45 may be about 0.300 inches. Although the diameter of an intermediate opening 45 may vary with engine design, the diameter of a useful intermediate opening 45 may be between about 0.200 inches and about 0.500 inches. The diameters of the intermediate openings 45 of a variable penetration dilution jet array 42 may vary so that the dilution air 50 may be projected at more than three radial locations simultaneously.

Methods for producing the combustor can assemblies 40 and the variable penetration dilution jet arrays 42 are known in the art. Useful methods for forming the variable penetration dilution jet array 42 may include electrical discharge machining (EDM) or laser drilling. Laser drilling may be useful for producing the variable penetration dilution jet array 42. The variable penetration dilution jet array 42 may comprise a plurality of dilution jet opening forms. The dilution jet opening forms may vary in diameter. When compared with one another, the scroll cooling openings 43 may have the smallest diameters and the core penetrating openings 44 may have the largest diameters. The intermediate openings 45 may have diameters that are larger than the scroll cooling openings 43 and smaller than the core penetrating openings 44.

The combustor can assemblies 40 of the present invention may be easily retrofitted into existing turbine engines. The sizing of the scroll cooling openings 43, core penetrating openings 44 and intermediate openings 45 may be set to a certain percentage above and below nominal to maintain pressure drop and airflow consistent with uniform orifice sizing.

EXAMPLE

A combustor can and scroll assembly for an engine was produced. The combustor can had an axial length of 7 inches and a diameter of 5¼ inches. The variable penetration dilution jet array comprised four core penetrating openings each having a diameter of 0.470 inches, eight scroll cooling openings, each having a diameter of 0.200 inches, and four intermediate openings, each having a diameter of 0.280 inches. The variable penetration dilution jet array was positioned in one axial plane 1½ inches forward from the aft end edge of the combustor can. The dilution jet opening forms were evenly distributed around the circumference of the combustor can as shown in FIG. 2a. During engine operation, scroll temperatures remained acceptable even though effusion cooling to the scroll had been reduced.

As can be appreciated by those skilled in the art, the present invention provides improved combustor assemblies and methods for their production. A combustor assembly capable of reducing scroll cooling requirements is provided. Further, dilution arrays capable of improved combustor core penetration and improved pattern factor are provided. Also provided are improved combustors that can be easily retrofitted into existing turbine engines. Further, a can and scroll combustor assembly having an improved pattern factor is provided.

It should be understood, of course, that the foregoing relates to exemplary embodiments of the invention and that modifications may be made without departing from the spirit and scope of the invention as set forth in the following claims.

We claim:

1. A combustor assembly comprising:
    a combustor can used with a scroll; and
    a variable penetration dilution jet array positioned in an aft portion of said combustor can there through, said variable penetration dilution jet array providing a dilution air flow such that a pattern factor at an exit plane of said combustor can is reduced and provides a film cooling flow to said scroll.

2. The combustor assembly of claim 1, wherein said variable penetration dilution jet array is positioned in one axial plane of said aft portion.

3. The combustor assembly of claim 1, wherein said variable penetration dilution jet array is positioned in at least two axial planes of said aft portion.

4. The combustor assembly of claim 1, wherein said variable penetration dilution jet array comprises a plurality of scroll cooling openings and a plurality of core penetrating openings.

5. The combustor assembly of claim 4, wherein the diameter of each said scroll cooling opening is between about 0.100 inches and about 0.300 inches diameter.

6. The combustor assembly of claim 4, wherein the diameter of each said core penetrating opening is between about 0.400 inches and about 0.800 inches diameter.

7. The combustor assembly of claim 4, wherein said variable penetration dilution jet array further comprises a plurality of intermediate openings.

8. The combustor assembly of claim 7, wherein the diameter of each said intermediate opening is between about 0.200 inches and about 0.500 inches.

9. The combustor assembly of claim 7, wherein the number of said scroll cooling openings is greater than the number of said intermediate openings.

10. The combustor assembly of claim 1, wherein said variable penetration dilution jet array comprises a plurality of scroll cooling openings positioned in a first axial plane of said aft portion and a plurality of core penetrating openings positioned in a second axial plane of said aft portion.

11. A can-and-scroll combustor assembly comprising:
    a combustor can;
    a scroll positioned downstream and in flow communication with said combustor can;
    a plurality of scroll cooling openings through said combustor can, said scroll cooling openings provide a film cooling flow to said scroll; and
    a plurality of core penetrating openings through said combustor can, said core penetrating openings provide dilution air to a hot gas flow core of said combustor can.

12. The can-and-scroll combustor assembly of claim 11, wherein said combustor can has a pattern factor at an exit plane, and further comprising a plurality of intermediate openings through said combustor can, said intermediate openings provide dilution air such that said pattern factor at said exit plane is reduced.

13. The can-and-scroll combustor assembly of claim 12, wherein the number of said intermediate openings is about equal the number of core penetrating openings.

14. The can-and-scroll combustor assembly of claim 11, wherein said combustor can is a tapered aft end combustor can.

15. The can-and-scroll combustor assembly of claim 11, wherein the number of said scroll cooling openings is about twice the number of core penetrating openings.

16. The can-and-scroll combustor assembly of claim 11, wherein said scroll cooling openings and said core penetrating openings are uniformly circumferentially spaced.

17. The can-and-scroll combustor assembly of claim 11, wherein said scroll cooling openings and said core penetrating openings are positioned in one axial plane of said combustor can.

18. A variable penetration dilution jet array for an assembly having a combustor can and a scroll comprising:
    a plurality of core penetrating openings positioned circumferentially about said combustor can;
    a plurality of scroll cooling openings positioned circumferentially about said combustor can, said scroll cooling openings offset from said core penetrating openings; and
    a plurality of intermediate openings positioned circumferentially about said combustor can, said intermediate openings offset from said core penetrating openings.

19. The variable penetration dilution jet array of claim 18, wherein said scroll cooling openings provide a film cooling flow to said scroll.

20. The variable penetration dilution jet array of claim 18, wherein said core penetrating openings are positioned in one axial plane of said combustor can.

21. The variable penetration dilution jet array of claim 18, wherein said intermediate openings are positioned in at least two axial planes of said combustor can.

22. The variable penetration dilution jet array of claim 18, wherein the number of scroll cooling openings is greater than the number core penetrating openings.

23. The variable penetration dilution jet array of claim 18, wherein the diameter of each said scroll cooling opening is between 0.100 inches and about 0.300 inches: and wherein the diameter of each said core penetrating opening is between 0.400 inches and about 0.800 inches.

24. A combustor assembly for a turbine engine having a scroll comprising:
   a combustor can;
   a plurality of core penetrating openings circumferentially positioned about an axial plane of said combustor can, said core penetrating openings uniformly spaced; and
   a plurality of scroll cooling openings circumferentially positioned about said axial plane of said combustor, said scroll cooling openings uniformly spaced.

25. The combustor assembly of claim 24, further comprising a plurality of intermediate openings circumferentially positioned about said axial plane of said combustor, said intermediate openings uniformly spaced.

26. The combustor assembly of claim 24, wherein each said core penetrating opening has a diameter between about 0.400 inches and about 0.800 inches.

27. The combustor assembly of claim 24, wherein each said scroll cooling opening has a diameter between about 0.100 inch and about 0.300 inches.

28. An apparatus for a can-and-scroll combustor assembly comprising:
   at least one core penetrating opening through an aft end portion of said combustor can, said core penetrating opening providing dilution air to a hot gas flow core of said can;
   at least one scroll cooling opening through said aft end portion of said combustor can, said scroll cooling opening providing a film cooling flow to said scroll; and
   at least one intermediate opening through said aft end portion of said combustor can, said intermediate opening flow reducing temperature variation at the exit plane of said combustor can.

29. The apparatus of claim 28, wherein;
   said at least one core penetrating opening is four core penetrating openings each having a diameter between about 0.400 inches and about 0.800 inches:
   said at least one scroll cooling opening is eight scroll cooling openings each having a diameter between about 0.100 inch and about 0.300 inches; and
   said at least one intermediate opening is four intermediate openings each having a diameter between about 0.200 inches and about 0.500 inches.

30. A method of providing dilution air to a combustor can-and-scroll assembly comprising the steps of:
   projecting a first portion of dilution air through at least one axial plane of said combustor can such that a film cooling flow is provided to said scroll; and
   projecting a second portion of dilution air through at least one axial plane of said such combustor can such that the temperature of a hot gas flow core of said can is reduced.

31. The method of claim 30, further comprising the step of projecting a third portion of dilution air through at least one axial plane of said combustor can such that a temperature variation at an exit plane of said combustor can is reduced.

32. The method of claim 30, wherein said step of projecting a first portion of dilution air is through at least two axial planes of said combustor can.

33. The method of claim 30, wherein said step of projecting a second portion of dilution air is through at least two axial planes of said combustor can.

* * * * *